(No Model.)
J. E. ATWOOD.
CRANK.
No. 291,972. Patented Jan. 15, 1884.
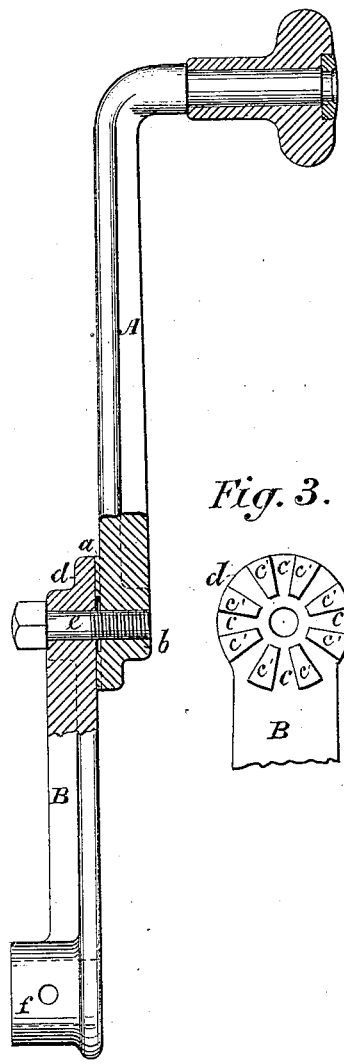
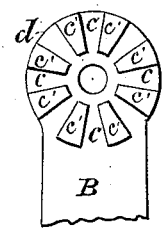
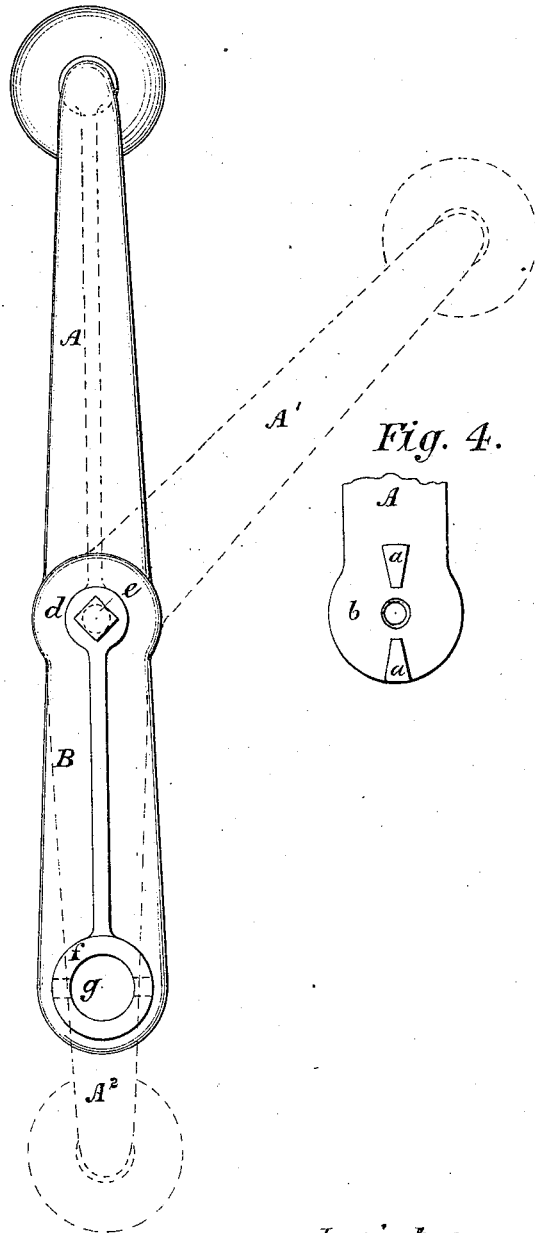
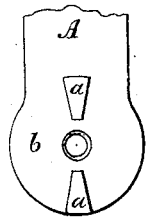
Witnesses
Fred K Haynes
Ed. L. Moran
Inventor
John E. Atwood
by his Attorneys
Brown & Brown

UNITED STATES PATENT OFFICE.

JOHN E. ATWOOD, OF STONINGTON, CONNECTICUT.

CRANK.

SPECIFICATION forming part of Letters Patent No. 291,972, dated January 15, 1884.

Application filed June 30, 1883. (No model.)

*To all whom it may concern:*

Be it known that I, JOHN E. ATWOOD, of Stonington, in the county of New London and State of Connecticut, have invented a certain new and useful Improvement in Cranks of Variable Length; and I do hereby declare the following to be a full, clear, and exact description thereof, reference being had to the accompanying drawings, forming a part of this specification.

My invention is more especially designed for hand-cranks applied or to be applied to various kinds of machines which are operated by hand.

It consists in a crank composed of two members or arms having heads, which are secured in face-to-face contact and held one on the other by a bolt passing through them, whereby provision is afforded, by slackening the bolt and turning one arm or member on said bolt, for adjusting it into different positions relatively to the other arm or member.

In the drawings, Figure 1 is a side view of a hand-crank containing my invention, shown partly in section. Fig. 2 is a back view of the same, showing by dotted lines one of the two arms of the crank in various positions relative to the other, the effective length of the crank being different in the several positions, varying from the combined length to the difference in length of the two arms. Figs. 3 and 4 are detail views, showing the construction of the contiguous faces of the two arms or members that form the elbow-joint for the adjustment of the crank, Fig. 3 showing a series of projections between which are recesses or notches of uniform shape and size, and Fig. 4 showing projections to correspond and enter the recesses shown in Fig. 3.

Similar letters refer to similar parts throughout the several views.

A B indicate the two arms or members of the crank, which may be of any suitable cross-section, and having a difference in their length equal to the smallest desired effective length of the crank. They are united together by a pin or screw, $e$, which constitutes the center or pivot of an elbow-joint, and around the hole which receives this pivot one or more projections, $a\,a$, are formed in the back of the boss or head $b$ in the arm A, the said projections corresponding to and entering notches or recesses $c\,c$, formed between projections $c'\,c'$ in the front of the boss or head $d$ of the arm B. When the screw $e$ is screwed up, the projections $a\,a$, entering the notches $c\,c$, render the elbow-joint rigid, and so render it impossible to turn the two arms of the crank relatively to each other. The arm A is arranged at its outer end to receive any ordinary handle to turn the crank, or may be made with an ordinary wrist to receive a connecting-rod. The arm B has the usual or a suitable boss, $f$, at one end, provided with an opening, $g$, to correspond and admit the end of the shaft or spindle to which the crank is to be applied.

To operate my invention in order to change the relative position of the two arms of the crank, the pin or screw $e$ is loosened sufficiently to disengage the projections $a\,a$ in the arm A from the notches $c\,c$ in the arm B. The arm A is then turned to the desired position—as, for instance, A' A², indicated by dotted lines—in which positions the projections $a\,a$ will engage with the notches $c\,c$, and the said arm A be again secured to the arm B by tightening the said screw $e$.

The notches $c\,c$, being arranged equidistant in circles concentric to the pin $e$, will afford facility for setting the two arms or members A B of the crank at various angles to each other, to vary and adjust the effective lengths of the crank, and will also afford facility, when there are two such hand-cranks on the same shaft, one at each end, for setting both of said cranks to the same stroke.

What I claim as my invention, and desire to secure by Letters Patent, is—

1. A crank composed of two members or arms, A B, having heads $b\,d$, which are secured in face-to-face contact and held one on the other by a bolt passing through them, whereby provision is afforded, by slackening the bolt and turning the arm or member A on said bolt, for adjusting it into different positions relatively to the arm or member B, substantially as herein described.

2. A crank composed of two members or arms, A B, having heads $b\,d$, which are secured in face-to-face contact and held one on the other by a bolt passing through them, and which are provided with projections and notches on their contact-faces, so as to interlock with each other, whereby provision is afforded, by slackening the bolt and turning the arm or member A thereon, for securing said arm or member in different positions relatively to the arm or member B, substantially as described.

JOHN E. ATWOOD.

Witnesses:
JOSEPH JOSEPH,
WM. A. GILBERT.